United States Patent
Tanke et al.

(10) Patent No.: US 10,808,762 B2
(45) Date of Patent: Oct. 20, 2020

(54) BEARING ASSEMBLY

(71) Applicants: Aktiebolaget SKF, Gothenburg (SE); SKF Lubrication Systems Germany GmbH, Walldorf (DE)

(72) Inventors: Jesko-Henning Tanke, Schweinfurt (DE); Kai Engemann, Bergheim (DE); Martin Teupner, Neulussheim (DE)

(73) Assignees: AKTIEBOLAGET SKF, Gothenburg (SE); SKF LUBRICATION SYSTEMS GERMANY GMBH, Walldorf (DE)

( * ) Notice: Subject to any disclaimer, the term of this patent is extended or adjusted under 35 U.S.C. 154(b) by 0 days.

(21) Appl. No.: 16/295,713

(22) Filed: Mar. 7, 2019

(65) Prior Publication Data

US 2019/0285118 A1    Sep. 19, 2019

(30) Foreign Application Priority Data

Mar. 14, 2018    (DE) .................. 10 2018 203 917

(51) Int. Cl.
  *F16C 33/66*    (2006.01)
  *F16C 33/58*    (2006.01)

(52) U.S. Cl.
  CPC ........ *F16C 33/6622* (2013.01); *F16C 33/583* (2013.01); *F16C 33/6607* (2013.01); *F16C 2300/14* (2013.01)

(58) Field of Classification Search
  CPC .. F16C 33/583; F16C 33/586; F16C 33/6622; F16C 2300/14; F16C 2360/31
  See application file for complete search history.

(56) References Cited

U.S. PATENT DOCUMENTS

| 9,523,350 B2 * | 12/2016 | Pasquet .................. F03D 80/70 |
| 2003/0048963 A1 | 3/2003 | Jacquemont et al. |
| 2010/0322543 A1 * | 12/2010 | Paluncic ............. F16C 33/6625 |
|  |  | 384/470 |
| 2012/0093450 A1 * | 4/2012 | Baun ..................... F16N 37/003 |
|  |  | 384/385 |

FOREIGN PATENT DOCUMENTS

| EP | 2233760 A1 | 9/2010 |
| EP | 2458164 A1 | 5/2012 |
| WO | 2006099014 A1 | 9/2006 |
| WO | WO-2009020215 A1 * | 2/2009 ......... F16C 33/6622 |
| WO | 2010040027 A2 | 4/2010 |

* cited by examiner

*Primary Examiner* — Phillip A Johnson
(74) *Attorney, Agent, or Firm* — J-Tek Law PLLC; Scott T. Wakeman; Mark A. Ussai

(57) ABSTRACT

A bearing assembly includes an inner ring and an outer ring that define a bearing interior between them and either the inner ring or the outer ring is fixed. When the inner ring is fixed, the inner ring includes at least one substantially radial through opening and when the outer ring is fixed, the outer ring includes at least one substantially axial and/or radial through opening, or at least one substantially axial and/or radial through opening is provided on a ring fixedly connected to the outer ring. The through opening is disposed between a 9 o'clock position and a 3 o'clock position on the inner ring when the inner ring is fixed or on the outer ring when the outer ring is fixed.

17 Claims, 3 Drawing Sheets

BEARING ASSEMBLY

CROSS-REFERENCE

This application claims priority to German patent application no. 10 2018 203 917.8 filed on Mar. 14, 2018, the contents of which are fully incorporated herein by reference.

TECHNOLOGICAL FIELD

The present disclosure is directed to a bearing assembly, including an inner ring and an outer ring that form a bearing interior between them, wherein one of the inner and outer rings is fixed and wherein the fixed one of the inner and outer rings includes a through opening through which used lubricant can be discharged.

BACKGROUND

Bearings are often grease-lubricated. In particular in the case of large bearings, such as are used in wind turbines and that may have a long service life of 20 years and more, the grease used must be continuously replaced. For this purpose it must be removed from the bearing. For this purpose an opening is required; however, due to the bearing geometry the opening often can not be embodied as large as is actually required. If the old grease is not removed from the bearing, either the freshly replaced grease escapes instead or the escaping of the grease occurs in an uncontrolled manner through the seals present. This can lead to damage to the bearing and the environment of the bearing, and also to dangerous working conditions. In addition, the bearing may become filled with too much grease, whereby unnecessarily elevated temperatures are generated, followed by poor lubrication conditions and premature grease aging.

SUMMARY

It is therefore an aspect of the present disclosure to make possible an improved removal of old lubricant from a bearing.

The disclosed bearing assembly includes either a fixed inner ring and a rotatable outer ring or a fixed outer ring and a rotatable inner ring, which form between them a bearing interior.

Lubricant can be present in the bearing interior in order to lubricate the bearing interior or rolling elements that can be disposed between the fixed inner ring and the rotating outer ring. A replacement of the lubricant is usually required during the service life of a bearing. However, in order to be able to supply new lubricant, the old, used, lubricant must be removed from the bearing.

According to the invention, if the inner ring is fixed, at least one essentially radial through opening is provided for this purpose on the inner ring. If the outer ring is fixed, at least one essentially radial and/or axial through opening can be provided on the outer ring and/or on a ring fixedly connected to the outer ring. Such a fixedly connected ring can serve, for example, as a fastening device for a seal or a seal system. The through opening is disposed on the fixed ring between a 9 o'clock and a 3 o'clock position.

During the movement of the rotating bearing outer ring or bearing inner ring the lubricant is moved in the bearing interior toward the 12 o'clock position of the inner ring. The inventors have recognized that during the rotation of the inner ring or outer ring the lubricant is moved out beyond the 12 o'clock position. The lubricant can therefore be guided out via through openings that are disposed between a 9 o'clock and a 3 o'clock position. The resulting distribution of the lubricant concentration along the circumference of the respective stationary ring is dependent on the bearing geometry and the rotational speed.

The through opening is preferably disposed between a 10 o'clock and a 2 o'clock position. Since it has been recognized that an advantageous amount of lubricant accumulates at this position during the rotation of the outer ring, the lubricant can thus be pumped particularly advantageously through the through opening disposed there. A position between 1 o'clock and 2 o'clock is particularly preferred since the required amount of lubricant escapes here due to the effects of the rotational movement.

The through opening can have a cross-section of more than 110 mm$^2$, however cross-sections over 250 mm$^2$, in particular more than 300 mm$^2$, particularly preferably more than 350 mm$^2$, are preferred. Here the through openings are configured in their size such that lubricant cannot easily flow out during operation, but rather only used lubricant is pushed out through the through openings in small amounts due to the prevailing dynamics in the bearing.

The bore of the through opening can vary over its length, wherein a minimum bore of 250 mm$^2$ is preferred to ensure the guiding-out of lubricant. The cross-section of the through opening can have different shapes, for example, circular, but can also be elliptical, elongated, or rectangular.

On the inner ring, the outer ring, or the ring fixedly connected to the outer ring a plurality of through openings can be provided, which are each disposed between a 9 o'clock and a 3 o'clock position, in particular between a 10 o'clock and a 2 o'clock position. The plurality of through openings can preferably be distributed uniformly between the 9 o'clock and the 3 o'clock position, in particular between the 10 o'clock and the 2 o'clock position. The bore of a single through opening has an upward limit on its size, since otherwise the lubricant can flow out unhindered from the bearing interior. Cross-sections significantly above 1300 mm$^2$ are avoided.

If a plurality of through openings is present, the removal of lubricant can be improved in comparison to a single through opening, since in total a larger escape opening is provided by the through openings.

According to a further embodiment the at least one through opening can be equipped with a cleaning system in order to allow the through opening(s) to be cleaned of grease. In this way a blockage of the lubricant in the one or the plurality of through openings can be prevented. The cleaning system can be, for example, a rotating spiral that is disposed in the through opening, or a cleaning piston that slips along the length of the through opening. The cleaning system can also be realized by an air nozzle that blows air out through the through opening into the bearing or out of the bearing. The through opening can be freed of lubricant by the air flow.

According to a further embodiment a suction device can be provided on at least one of the at least one through opening. The suction device can serve to support the lubricant outflow through the through openings. For this purpose the suction device sucks out lubricant abutting against the through openings, for example, using negative pressure. The suction device can be disposed, for example, in the bearing interior.

In order to capture the discharged lubricant, a reservoir can be connected directly or indirectly to the through opening. The reservoir can be detachably disposed on the bearing itself or can be provided removed therefrom and connected to the bearing by a hose or another line. The reservoir can itself be configured as a fixed container or as a hose that can be, for example, flexibly adapted to the bearing. The reservoir is preferably disposed below the through opening so that the lubricant can drain into the reservoir.

According to a further embodiment a line system can be disposed on the one or the plurality of through openings in order to discharge the lubricant. For example, the reservoir can be connected to the line system into which the used lubricant is guided. The line system can be comprised of a hose that is flexible and can be easily adapted to the bearing. Alternatively the line system can also be comprised of rigid components that are connected to the through openings. The reservoir can be detachably disposed on the bearing itself or can be provided removed therefrom and connected to the bearing or the line system using a hose or another line. The reservoir can be connected to the line system in a sealed manner.

According to a further embodiment the through opening can include an inner thread into which, for example, a connecting element can be screwed-in in order to be able to connect the line system.

In addition to the exchange of the lubricating grease, a venting of the bearing assembly can also be necessary. Since there is a high temperature difference between start- and operating-temperature, if the bearing interior is hermetically sealed with respect to the environment a thermally induced internal pressure can arise that can press on the seal lips of the bearing and cause significant problems. For example, accelerated seal-lip wear can thereby result. Furthermore, an increased risk of grease loss due to leakage can occur, whereby bearing friction is increased. Furthermore, due to the increased internal pressure, grease aging can be accelerated, which in turn leads to a poorer lubricating effect and a more pronounced thermal deformation of the bearing.

According to a further embodiment of the invention this is prevented by a venting opening being provided on the inner ring, which venting opening is directly or indirectly connected with the surrounding air. A pressure equalization of the bearing interior with the environment can occur via the venting opening.

The line system can include a corresponding ventilation opening that is connected with the surrounding air. In this way the venting opening in the inner ring can be in contact with the surrounding air by the ventilation opening via the line system and carry out a pressure equalization.

Further advantages and advantageous embodiments are specified in the description, the drawings, and the claims. Here in particular the combinations of features specified in the description and in the drawings are purely exemplary, so that the features can also be present individually or combined in other ways.

In the following the invention shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
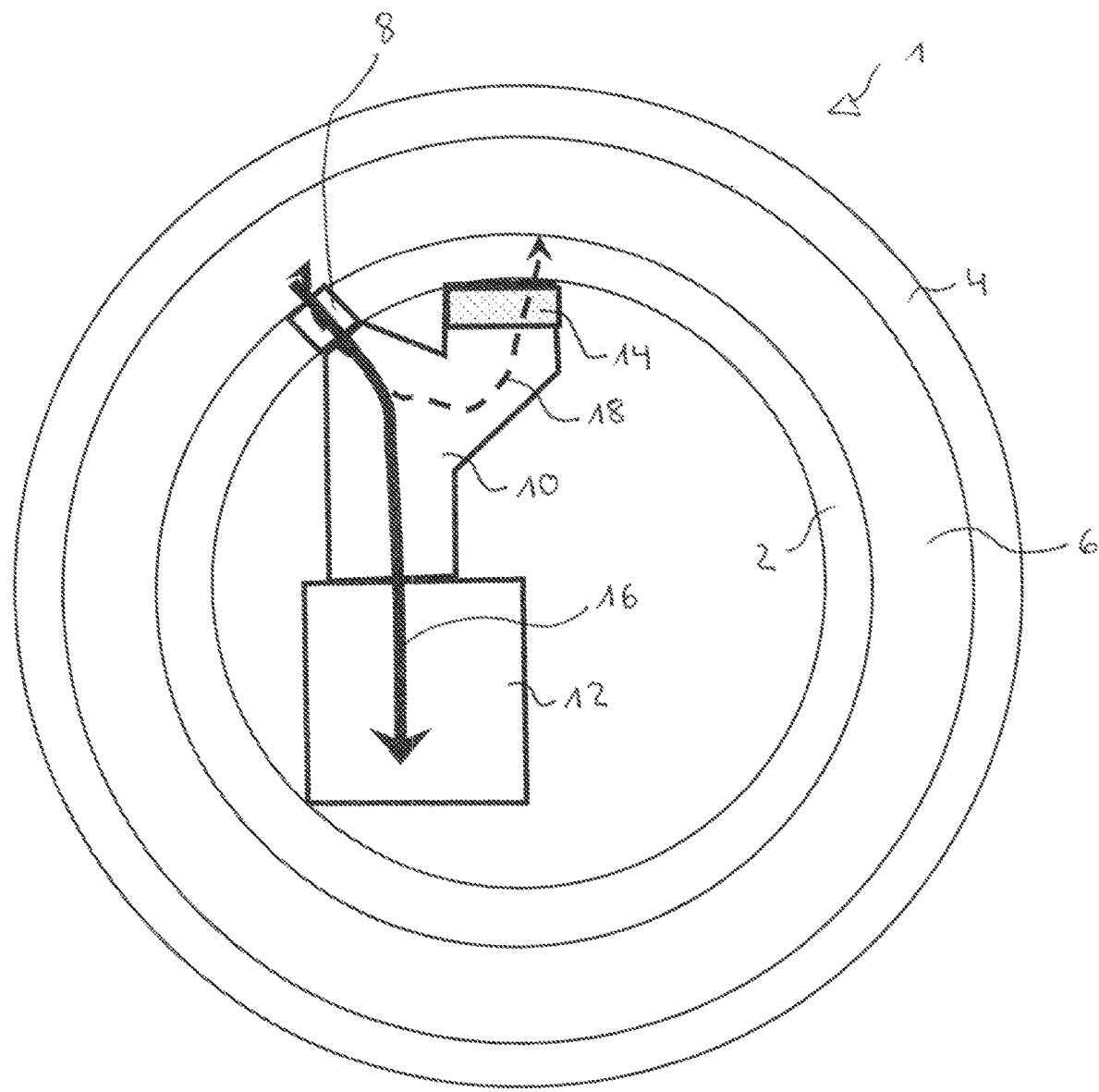
FIG. 1 is a schematic sectional view of a bearing ring including a radial opening which radial opening is connected to a lubricant-collecting container.

FIG. 1 shows a bearing 1 including a fixed inner ring 2 and a rotating outer ring 4 that define a bearing interior 6 between them wherein rolling elements (not shown) can be disposed. As a not-shown alternative the outer ring 4 can be fixed and the inner ring 2 can rotate. The designs for the fixed inner ring 2 thus also apply for a fixed outer ring 4.

Lubricant is usually located in the bearing interior 6, in order to ensure the lubrication of the bearing 1, in particular of rolling elements. The lubricant must be replaced during the service life of the bearing 1. In order to be able to introduce new lubricant into the bearing 1, the old lubricant must first be removed from the bearing.

For this purpose a through opening 8 is provided in the inner ring 2. The through opening 8 is located on the inner ring 2 between a 9 o'clock and a 3 o'clock position. During a rotation of the outer ring 4 old lubricant is pumped to this region and rests there at the inner ring 2 and thus at the through opening 8. Due to the rotation, the force of gravity, and the further dynamics in the bearing 1 the lubricant is then pressed through the through opening 8 or flows through it as indicated by the arrow 16.

A suction device can be provided between the through opening 8 and the line system 10. Such a suction device can support the outflow of the lubricant through the through opening 8 by negative pressure.

The through opening 8 can be an essentially radial through opening that has a bore of more than 110 mm$^2$. It can be ensured by this bore that the lubricant is pumped out of the bearing interior 6 through the through opening 6 solely due to the dynamics in the bearing 1.

The through opening 8 can be connected to a reservoir 12 wherein the lubricant is collected. The reservoir 12 can be used for collecting used lubricant and can be disposed inside the bearing 1, as shown in FIG. 1, but also outside the bearing 1. If the reservoir 12 is full, it can be exchanged.

As shown in FIG. 1 the through opening 8 can also be connected to a line system 10. The line system 10 can be comprised of a hose or a similar flexible element or of rigid components. Via the line system 10 the lubricant can be pumped directly from the through opening 8 into the reservoir 12. In the latter case the reservoir 12 can be connected to the line system 10 via a line.

Since there is a high temperature difference between the starting and operating temperatures of the bearing 1, if the bearing interior 6 is hermetically sealed with respect to the environment a thermally induced internal pressure can arise that can press on the seal lips of the bearing 1 and cause significant problems. In order to avoid this, a ventilation opening 14 is provided in the line system 10, which ventilation opening 14 serves for pressure equalization with the environment. The air flow is indicated by the arrow 18. The ventilation opening 14 can include a filter to keep moisture out of the bearing 1. The ventilation opening 14 can be disposed in the inner ring separately from and preferably over the through opening 8. Due to this arrangement the air can escape particularly well from the bearing 1 via the ventilation opening 14. In this case the through opening 8 simultaneously serves as venting opening for the bearing 1. Due to the through opening 8 and the ventilation opening 14 the pressure equalization between the bearing 1 and the surrounding air can thus be effected.

Figure 2:
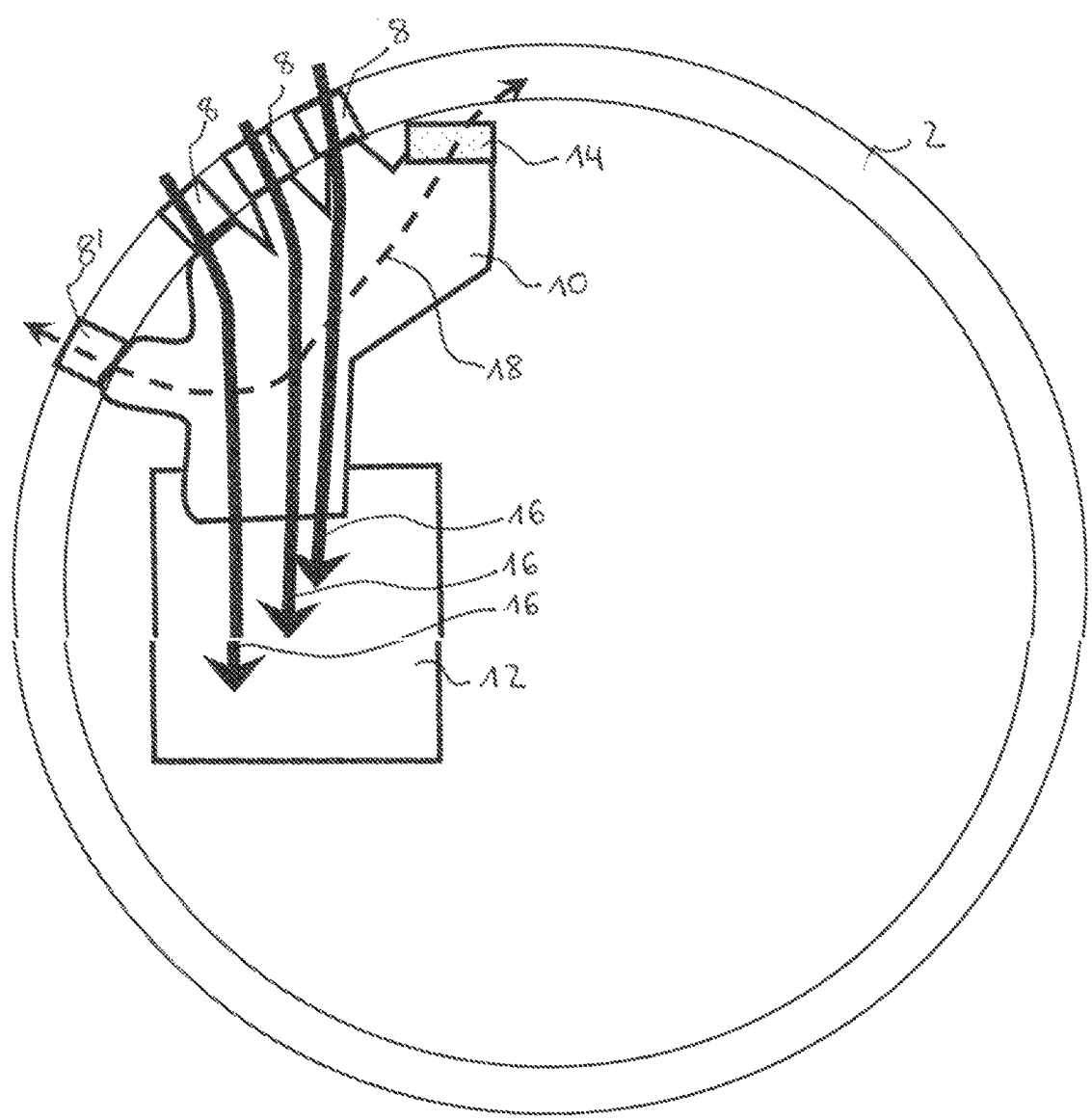
FIG. 2 is a schematic sectional view of a bearing ring including a plurality of radial openings that are connected to a lubricant-collecting container.

In one alternative embodiment that is shown in FIG. 2 a plurality of through openings 8, 8' can be provided in the inner ring 2. As shown, all through openings 8, 8' are connected to the line system 10 in order to thereby discharge lubricant. For example, four to six of these through openings 8, 8' can be provided that are disposed between a 9 o'clock position and a 3 o'clock position. In FIG. 2 the through openings 8, 8' are disposed about an 11 o'clock position, however a position between 1 o'clock and 2 o'clock is particularly preferred. Due to the movement of the lubricant in the bearing 1 the used lubricant is located (tends to accumulate) in this region, which used lubricant can be pressed-out through the through openings 8 due to the dynamics of the bearing 1.

As also in FIG. 1 a suction device can be provided between the through openings 8 and the line system 10, which suction device supports the outflow of the lubricant through the through openings 8 by negative pressure.

In the embodiment shown in FIG. 2 one of the through openings 8' can be used as venting opening. A pressure equalization between the environment and the bearing interior 3 can be effected by the venting opening 8' and the ventilation opening 14. The venting opening 8' can be disposed at a position somewhat past 9 o'clock since less lubricant is located at this position.

Figure 3:
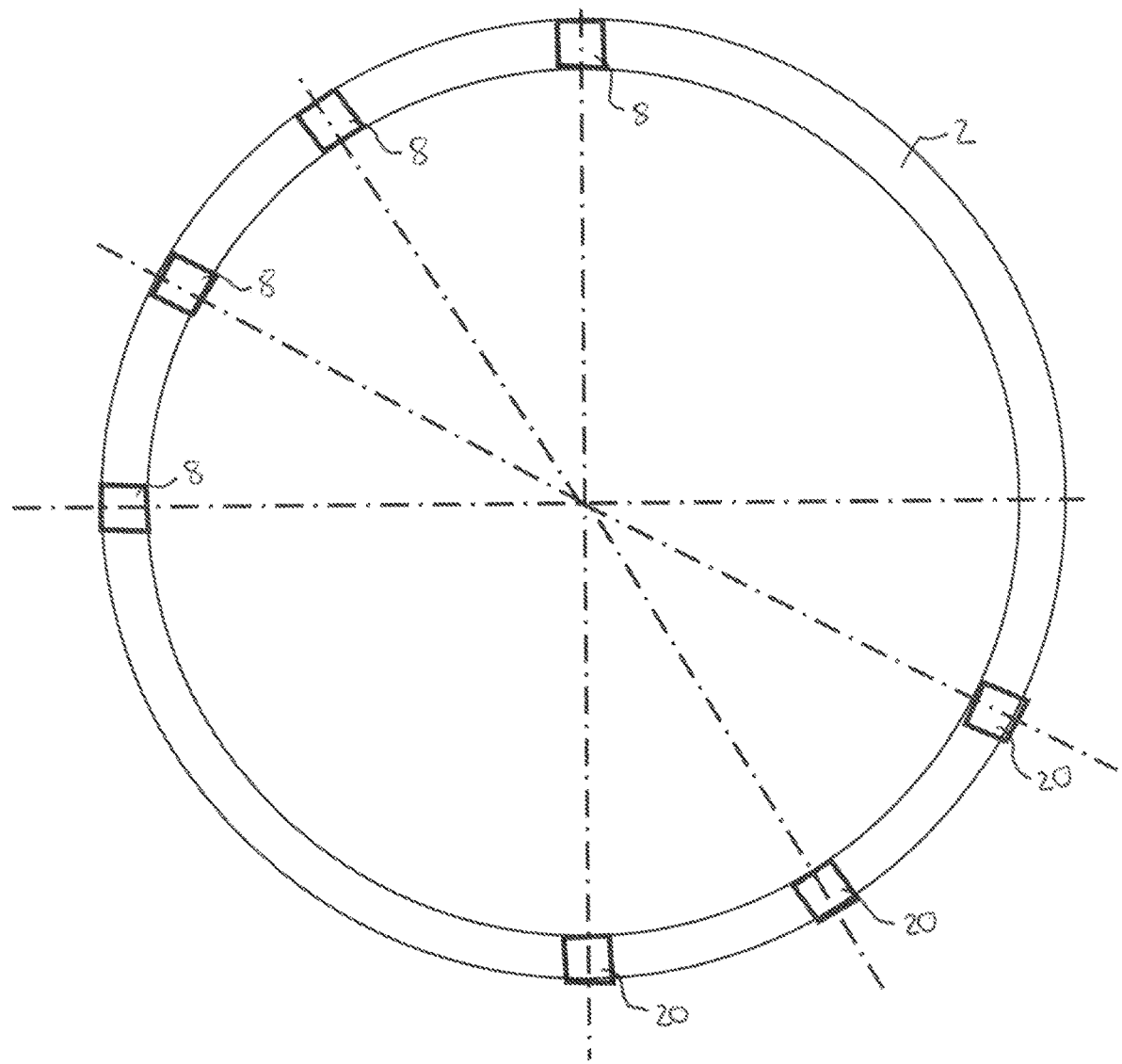
FIG. 3 is a schematic sectional view of a bearing ring including a plurality of radial openings.

As already explained, during the service life of the bearing 1 lubricant is discharged from the bearing 1 and fresh lubricant is also introduced into the bearing 1. For this purpose there can be further introduction openings 20 in the respective stationary ring, thus in the inner ring 2 in the case of rotating outer ring. As shown in FIG. 3 these introduction openings 20 can radially oppose the through openings 8 for the removal of the lubricant. Although three introduction openings 20 are shown, more or fewer introduction openings 20 can also be provided. The introduction openings 20 are disposed at a position out from which new lubricant is well distributed during the rotation of the bearing without being pumped directly back out of the bearing 1 through the through openings 8. Due to the selected position shortly behind the through openings 8 in the direction of rotation it is achieved that the freshly introduced lubricant mixes optimally with the already present lubricant before it reaches the vicinity of the through openings 8 due to the rotational movement of the bearing 1. The escape of fresh lubricant from the through opening 8 is thus minimized.

As can further be seen in FIG. 3, the through openings 8 and the introduction openings 20 are uniformly spaced. This is advantageous since a uniform removal and introduction of lubricant can thus be achieved.

Due to the disclosed bearing assembly, used lubricant can be discharged from the bearing in a simple manner. The lubrication in the bearing can thereby be improved since old, used lubricant cannot accumulate.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assembly.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing
2 Inner ring
4 Outer ring
6 Bearing interior
8, 8' Through opening
10 Line system
12 Reservoir
14 Ventilation opening
16 Lubricant flow
18 Air flow
20 Introduction openings

What is claimed is:

1. A bearing assembly comprising:
an inner ring and an outer ring that define a bearing interior between them,
wherein either the inner ring or the outer ring is fixed,
wherein when the inner ring is fixed, the inner ring includes at least one substantially radial exit through opening configured to connect the bearing interior to a used lubricant disposal reservoir and when the outer ring is fixed, the outer ring and/or a ring fixedly connected to the outer ring includes at least one substantially axial and/or radial exit through opening configured to connect the bearing interior to the used lubricant disposal reservoir, and
wherein every one of the at least one exit through opening is disposed between a 9 o'clock position and a 3 o'clock position in a clockwise direction on the inner ring when the inner ring is fixed or on the outer ring when the outer ring is fixed.

2. The bearing assembly according to claim 1, wherein every one of the at least one exit through opening is disposed between a 10 o'clock position and a 2 o'clock position in the clockwise direction.

3. The bearing assembly according to claim 1, wherein the at least one exit through opening has a bore of greater than 250 mm$^2$.

4. The bearing assembly according to claim 1, wherein the at least one exit through opening has a bore of greater than 350 mm$^2$.

5. The bearing assembly according to claim 1, wherein the bearing interior is lubricated with lubricating grease.

6. The bearing assembly according to claim 1, including the used lubricant disposal reservoir.

7. The bearing assembly according to claim 1, wherein the at least one exit through opening comprises no more than one exit through opening.

8. The bearing assembly according to claim 1, including at least one substantially radial introduction through opening configured to connect the bearing interior to a source of fresh lubricant, the at least one introduction through opening being located between the 3 o'clock position and the 9 o'clock position in the clockwise direction.

9. The bearing assembly according to claim 8, wherein the at least one introduction through opening is diametrically opposite the at least one exit through opening.

10. The bearing assembly according to claim 1, including a line system connected with the surrounding air disposed at the at least one exit through opening.

11. The bearing assembly according to claim 10, including at least one substantially radial introduction through opening configured to connect the bearing interior to a source of fresh lubricant, the at least one introduction through opening being located between the 3 o'clock position and the 9 o'clock position in the clockwise direction.

12. The bearing assembly according to claim 11, wherein the at least one introduction through opening is diametrically opposite the at least one exit through opening.

13. The bearing assembly according to claim 1, wherein a venting opening is provided on the inner ring, the venting opening being directly or indirectly connected with the surrounding air.

14. The bearing assembly according to claim 13, including at least one substantially radial introduction through opening configured to connect the bearing interior to a source of fresh lubricant, the at least one introduction through opening being located between the 3 o'clock position and the 9 o'clock position in the clockwise direction.

15. The bearing assembly according to claim 14, wherein the at least one introduction through opening is diametrically opposite the at least one exit through opening.

16. A bearing assembly comprising:
an inner ring and an outer ring that define a bearing interior between them,
wherein either the inner ring or the outer ring is fixed,
wherein when the inner ring is fixed, the inner ring includes at least one substantially radial through opening and when the outer ring is fixed, the outer ring includes at least one substantially axial and/or radial through opening, or at least one substantially axial and/or radial through opening is provided on a ring fixedly connected to the outer ring, and
wherein the through opening is disposed between a 9 o'clock position and a 3 o'clock position on the inner ring when the inner ring is fixed or on the outer ring when the outer ring is fixed, and
including a line system connected with the surrounding air disposed at the at least one through opening of the inner ring or at the at least one through opening of the outer ring.

17. A bearing assembly comprising:
an inner ring and an outer ring that define a bearing interior between them,
wherein either the inner ring or the outer ring is fixed,
wherein when the inner ring is fixed, the inner ring includes at least one substantially radial through opening and when the outer ring is fixed, the outer ring includes at least one substantially axial and/or radial through opening, or at least one substantially axial and/or radial through opening is provided on a ring fixedly connected to the outer ring,
wherein the through opening is disposed between a 9 o'clock position and a 3 o'clock position on the inner ring when the inner ring is fixed or on the outer ring when the outer ring is fixed, and
wherein a venting opening is provided on the inner ring, the venting opening being directly or indirectly connected with the surrounding air.

* * * * *